L. L. MAYER.
SCRAPING AND LEVELING DEVICE.
APPLICATION FILED MAR. 26, 1914.
1,162,182.  Patented Nov. 30, 1915.
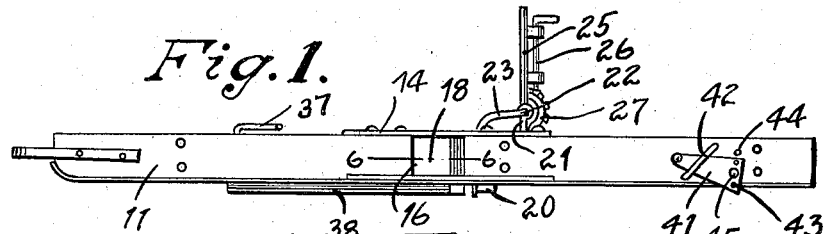
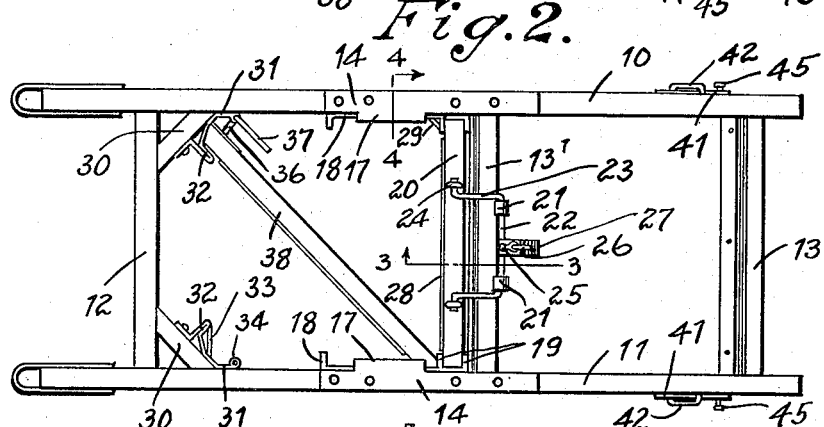
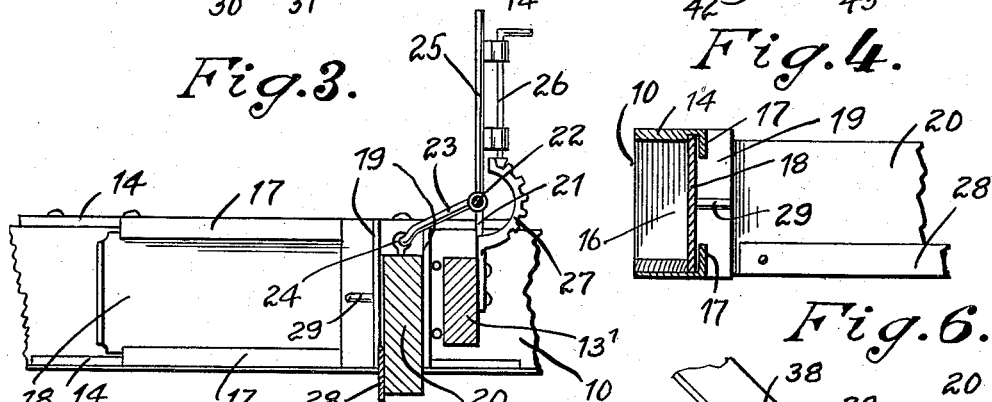
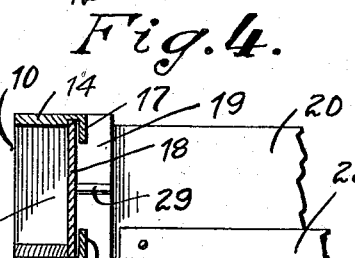
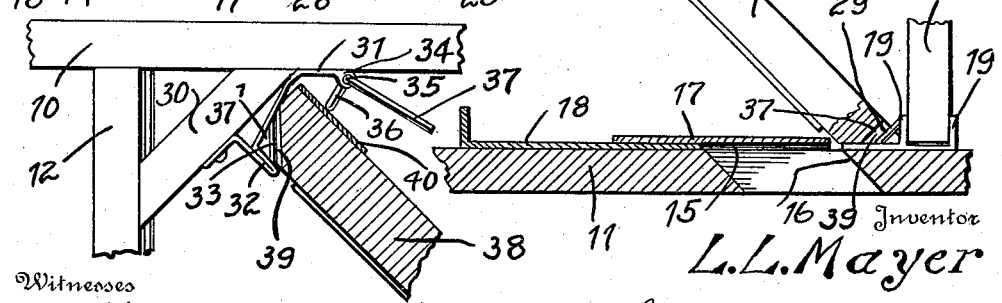

UNITED STATES PATENT OFFICE.

LOUIS L. MAYER, OF VALE, SOUTH DAKOTA.

SCRAPING AND LEVELING DEVICE.

1,162,182.     Specification of Letters Patent.     Patented Nov. 30, 1915.

Application filed March 26, 1914. Serial No. 827,430.

*To all whom it may concern:*

Be it known that I, LOUIS L. MAYER, a citizen of the United States, residing at Vale, in the county of Butte, State of South Dakota, have invented certain new and useful Improvements in Scraping and Leveling Devices; and I do hereby declare the following to be a full, clear, and exact description of the invention, such as will enable others skilled in the art to which it appertains to make and use the same.

This invention relates to improvements in land levelers.

The principal object of the invention is to provide a simple and efficient device of this character which is particularly adapted for leveling land for irrigation purposes and for filling and leveling furrows.

Another object is to provide novel means for adjustably securing the scraper blades of the device.

A further object is to provide a device of this character which will automatically transfer soil from the points being leveled so as to fill any adjacent depressions.

A still further object is to provide novel means for controlling the above mentioned dispersion of the soil.

Other objects and advantages will be apparent from the following description, when taken in connection with the accompanying drawings.

In the drawings: Figure 1 is a side elevation of my invention. Fig. 2 is a top plan view. Fig. 3 is a detail section on the line 3—3 of Fig. 2. Fig. 4 is a transverse section on the line 4—4 of Fig. 2. Fig. 5 is an enlarged detail plan view of a portion of the frame, illustrating the adjustment of one of the scraper blades, the same being partly broken away. Fig. 6 is a longitudinal sectional view on the line 6—6 of Fig. 1.

Referring particularly to the accompanying drawings, there is shown an elongated frame which includes the parallel side members 10 and 11, the transverse members 12 and 13 which connect respectively the front and rear ends of the side bars, and the intermediate transverse connecting member 13. Secured to the inner face of each of the side members 10 and 11 is a longitudinally extending plate 14, each of these plates having an elongated opening 15 which registers with a similar opening 16 formed in the side member. The upper and lower edges of the plate 14 are bent so as to extend toward each other as indicated at 17 to provide guides for a sliding controlling door or gate 18, said door or gate being arranged to be moved across the opening to regulate the size thereof. The other end of each of the plates 14 is formed with the parallel guiding flanges 19, and slidable vertically between these guiding flanges is a scraper bar 20. This bar 20 extends transversely of the frame and is disposed slightly in advance of the member 13 and in parallel relation therewith. Mounted on the member 13 are the vertically extending brackets 21 in which is mounted a rock shaft 22 provided on its ends with the forwardly extending arms 23, these arms being loosely connected to the eyes 24 carried by the scraper bar 20. Rigidly mounted on the shaft 22 is a vertical lever 25 which is provided with a pawl device 26 for engagement with a rack segment 27 also mounted on the member 13. The forward lower portion of the scraper bar 20 has secured thereto a metal scraping blade 28. Each of the plates 14 has extending across the outer angle formed by the forward of the flanges with the body portion of the plate, a bar or pin 29, the purpose of which will appear hereinafter.

By moving the lever 25 backward or forward, the shaft 22 will be rocked in the brackets 21 and the arms 23 forced to move the scraper bar 20 up and down between the guiding flanges 19. Thus the said scraper bar is capable of adjustment to project the scraper blade 28 below the frame and in position to act on the soil or be drawn up within the frame and out of contact with the soil.

Connecting the end member 12 with the side members 10 and 11 are the obliquely arranged braces 30, and secured within the angle formed between the side member and the brace is an angle plate 31. The forward end portion of this plate is a vertical flange 32, and extending between this flange and the portion of the plate which is secured to the brace 30 is a pin 33. The portion of the plate 31, which is attached to the side member, is formed with a pair of vertically alining apertured ears 34, and mounted in these ears is a vertical shaft 35 which is formed with a central crank portion 36 and a handle portion 37, the latter being disposed on the upper end of the shaft. Seated within the angle of the plate 14 and flange 19 is the beveled end 37 of a diagonally arranged scraper bar 38, the opposite end of which is engaged with the plate 31 and against the flange 32. Each end of the bar 38 is formed with the notches or kerfs 39 which receive the pins 29 and 33 respectively. The end of the bar which is engaged with the flange 31 is provided with a plate 40 which has a lateral flange at its outer end, this plate being disposed to be engaged by the crank portion 36 of the shaft 35 when said shaft is turned into operative position. It will be noted that the crank portion, when moved into operative position engages the lateral flange of the plate 40 so as to limit the movement thereof.

For ordinary leveling, the bar 20 is raised so that it will be out of engagement with the ground, or the bar may be entirely removed from the frame, and the bar 38 adjusted to the proper height and arranged to extend diagonally across the frame according to the side from which the soil is to be delivered. The sliding gate 18 at the delivery side of the frame is then moved to open position, and the frame drawn across the field by any suitable means. The soil which is loosened by the scraper bar 38 will travel toward the rear end of the bar and be delivered through the opening 15 thereat. When it is desired to deliver the soil at the opposite side of the frame, the shaft 35 is rotated to disengage the crank portion 36, whereupon the bar 38 can be disengaged from the pins 29 and 33, and then reseated to position the bar across the frame in the opposite direction. In this case the gate or door 18 which was open is then closed and the other door opened.

When the device is used for filling ditches, dead furrows and the like, the scraper bar 20 is adjusted to the proper distance below the frame and the bar 38 raised out of the way or removed entirely from the frame.

Particular attention is called to the manner in which the bar 38 is adjustably held. The distance between the flange 32 and the side bar is such that when the crank portion 36 is thrown out of engagement with the bar, this end of the bar will have a considerable amount of play in a direction toward the side bar and away from the flange 32. This causes the other end of the bar to be rocked and greatly facilitate the disengagement of the bar from the pin 29. The constant pressure of the soil against the bar, in the operation of the device causes the bar to be wedged tightly against the pins, and by providing this amount of play, the operator is enabled to quickly and easily remove the bar without the necessity of the use of special tools.

Pivotally mounted on the sides, and at the rear end portions of the side bars are the triangular plates 41, guides 42 straddling the plates, and serving to limit the swinging movements thereof. Each of the plates is provided with a plurality of openings 43 arranged in series concentric with the pivots of the plates said openings being arranged to register successively with openings 44 formed in the members 10 and 11 and receive removable pins 45. The lower corners of the members 41, when said members are swung downwardly, are arranged to bite into the soil so as to hold the frame against side movement, and against skidding.

What is claimed is:

1. A scraping and leveling device comprising a frame, a diagonally arranged removable scraper bar, the ends of said bar being formed with pluralities of notches, means carried by the frame for engagement in the notches at one end of the bar, and means carried by the frame for clamping engagement with the other end of the bar.

2. A scraping and leveling device comprising a frame, angle members carried by the frame, and formed with transverse webs, a scraper bar having notches at its ends, interchangeably receiving the webs of certain of the angle members, and means carired by certain others of the angle members for engagement with one end of the bar, for forcing said end of the bar into engagement with the last-named angle member, whereby both ends of the bar are held from vertical or lateral movement.

In testimony whereof, I affix my signature, in the presence of two witnesses.

LOUIS L. MAYER.

Witnesses:
A. M. ANDERSEN,
J. G. MUNYHAN.

Copies of this patent may be obtained for five cents each, by addressing the "Commissioner of Patents, Washington, D. C."